US012535535B2

(12) United States Patent
Kato

(10) Patent No.: US 12,535,535 B2
(45) Date of Patent: Jan. 27, 2026

(54) MALFUNCTION DIAGNOSIS APPARATUS AND MALFUNCTION DIAGNOSIS METHOD FOR WIRELESS POWER TRANSMISSION SYSTEM

(71) Applicant: DENSO CORPORATION, Kariya (JP)

(72) Inventor: Kazuyuki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 18/374,842

(22) Filed: Sep. 29, 2023

(65) Prior Publication Data

US 2024/0027541 A1 Jan. 25, 2024

Related U.S. Application Data

(63) Continuation of application No. PCT/JP2022/011409, filed on Mar. 14, 2022.

(30) Foreign Application Priority Data

Mar. 31, 2021 (JP) .................... 2021-059970

(51) Int. Cl.
*G01R 31/40* (2020.01)
*B60L 53/12* (2019.01)
(Continued)

(52) U.S. Cl.
CPC ............. *G01R 31/40* (2013.01); *B60L 53/12* (2019.02); *B60L 53/62* (2019.02); *H02J 50/402* (2020.01); *H02J 50/90* (2016.02)

(58) Field of Classification Search
CPC ......... G01R 31/40; B60L 53/12; B60L 53/62; B60L 3/0023; B60L 3/12; B60L 53/32;
(Continued)

(56) References Cited

U.S. PATENT DOCUMENTS

2012/0161533 A1* 6/2012 Urano .................... H02J 50/80
307/104
2014/0063666 A1* 3/2014 Kallal .................... H02H 3/20
361/56

(Continued)

FOREIGN PATENT DOCUMENTS

GB          2580082 A    7/2020
JP       2012-039787 A    2/2012

OTHER PUBLICATIONS

Liu et al., "Overview of Coil Designs for Wireless Charging of Electric Vehicle," IEEE, 2017.

*Primary Examiner* — Giovanni Astacio-Oquendo
*Assistant Examiner* — Haidong Zhang
(74) *Attorney, Agent, or Firm* — Oliff PLC

(57) ABSTRACT

A malfunction diagnosis apparatus diagnoses a malfunction of a wireless power transmission system including a plurality of power transmission units and a vehicle. Each unit is equipped with a plurality of power transmitting coils. The vehicle is equipped with a power receiving coil which works to receive electric power transferred from each unit. The apparatus includes an information receiver which receives power transmission unit information outputted from each unit and the power receiving information outputted from the vehicle, and a diagnostic unit which analyzes present position and time information about the vehicle which are included in the vehicle power receiving information, to identify target power transmission units that have transferred the electric power to the vehicle. The diagnostic unit works to compare between transmitted power information about the target power transmission units to diagnose a state of transmission of the electric power from each unit.

5 Claims, 10 Drawing Sheets

(51) Int. Cl.
*B60L 53/62* (2019.01)
*H02J 50/40* (2016.01)
*H02J 50/90* (2016.01)

(58) Field of Classification Search
CPC ........ B60L 53/68; B60L 53/66; H02J 50/402;
H02J 50/90; H02J 2310/48; H02J 50/10;
H02J 50/40; H02J 50/80; Y02T 10/70;
Y02T 10/7072; Y02T 90/12; Y02T 90/14
See application file for complete search history.

(56) References Cited

U.S. PATENT DOCUMENTS

| | | | |
|---|---|---|---|
| 2015/0008877 A1* | 1/2015 | Ichikawa | H04B 5/79 320/108 |
| 2016/0077164 A1 | 3/2016 | Toyoshima et al. | |
| 2016/0311337 A1* | 10/2016 | Ichikawa | H02J 7/00034 |
| 2018/0015832 A1* | 1/2018 | Nguyen | B60L 53/12 |
| 2022/0032778 A1 | 2/2022 | Kanesaki et al. | |

* cited by examiner

FIG.7

[EXAMPLE OF IMPROPER STATE OF POWER TRANSMISSION : POWER TRANSMISSION FAILURE IN POWER TRANSMISSION UNIT]

<TARGET POWER TRANSMISSION UNIT INFORMATION>

| INSTALLATION ZONE<br>TIME | SPOT C<br>TRANSMITTED POWER FROM FIRST POWER TRANSMISSION UNIT | SPOT D<br>TRANSMITTED POWER FROM SECOND POWER TRANSMISSION UNIT | SPOT E<br>TRANSMITTED POWER FROM THIRD POWER TRANSMISSION UNIT | SPOT F<br>TRANSMITTED POWER FROM FOURTH POWER TRANSMISSION UNIT | SPOT G<br>TRANSMITTED POWER FROM FIFTH POWER TRANSMISSION UNIT | SPOT H<br>TRANSMITTED POWER FROM SIXTH POWER TRANSMISSION UNIT | SPOT I<br>TRANSMITTED POWER FROM SEVENTH POWER TRANSMISSION UNIT | SPOT J<br>TRANSMITTED POWER FROM EIGHTH POWER TRANSMISSION UNIT | SPOT K<br>TRANSMITTED POWER FROM NINTH POWER TRANSMISSION UNIT | SPOT L<br>TRANSMITTED POWER FROM TENTH POWER TRANSMISSION UNIT |
|---|---|---|---|---|---|---|---|---|---|---|
| 08:00:00 AM | 0 | 0 | 0 | 0 | 0 | 0 | 0 | 0 | 0 | 0 |
| 08:00:01 AM | 0 | 0 | 0 | 0 | 0 | 0 | 0 | 0 | 0 | 0 |
| 08:00:02 AM | 10 | 0 | 0 | 0 | 0 | 0 | 0 | 0 | 0 | 0 |
| 08:00:03 AM | 0 | 10 | 0 | 0 | 0 | 0 | 0 | 0 | 0 | 0 |
| 08:00:04 AM | 0 | 0 | 10 | 0 | 0 | 0 | 0 | 0 | 0 | 0 |
| 08:00:05 AM | 0 | 0 | 0 | 10 | 0 | 0 | 0 | 0 | 0 | 0 |
| 08:00:06 AM | 0 | 0 | 0 | 0 | 0 | 0 | 0 | 0 | 0 | 0 |
| 08:00:07 AM | 0 | 0 | 0 | 0 | 0 | 10 | 0 | 0 | 0 | 0 |
| 08:00:08 AM | 0 | 0 | 0 | 0 | 0 | 0 | 10 | 0 | 0 | 0 |
| 08:00:09 AM | 0 | 0 | 0 | 0 | 0 | 0 | 0 | 10 | 0 | 0 |
| 08:00:10 AM | 0 | 0 | 0 | 0 | 0 | 0 | 0 | 0 | 10 | 0 |
| 08:00:11 AM | 0 | 0 | 0 | 0 | 0 | 0 | 0 | 0 | 0 | 10 |
| 08:00:12 AM | 0 | 0 | 0 | 0 | 0 | 0 | 0 | 0 | 0 | 0 |

FIFTH POWER TRANSMISSION UNIT : FAILURE IN POWER TRANSMISSION

<TARGET VEHICLE POWER RECEIVING INFORMATION>

| TIME | POWER RECEIVED BY FIRST VEHICLE | POSITION INFORMATION |
|---|---|---|
| 08:00:00 AM | 0 | SPOT A |
| 08:00:01 AM | 0 | SPOT B |
| 08:00:02 AM | 10 | SPOT C |
| 08:00:03 AM | 10 | SPOT D |
| 08:00:04 AM | 10 | SPOT E |
| 08:00:05 AM | 10 | SPOT F |
| 08:00:06 AM | 0 | SPOT G |
| 08:00:07 AM | 10 | SPOT H |
| 08:00:08 AM | 10 | SPOT I |
| 08:00:09 AM | 10 | SPOT J |
| 08:00:10 AM | 10 | SPOT K |
| 08:00:11 AM | 10 | SPOT L |
| 08:00:12 AM | 0 | SPOT M |

FIG.8

[EXAMPLE OF IMPROPER STATE OF POWER TRANSMISSION : DROP IN FUNCTION OF POWER TRANSMISSION UNIT]

⟨TARGET POWER TRANSMISSION UNIT INFORMATION⟩

| INSTALLATION ZONE<br>TIME | SPOT C<br>TRANSMITTED POWER FROM FIRST POWER TRANSMISSION UNIT | SPOT D<br>TRANSMITTED POWER FROM SECOND POWER TRANSMISSION UNIT | SPOT E<br>TRANSMITTED POWER FROM THIRD POWER TRANSMISSION UNIT | SPOT F<br>TRANSMITTED POWER FROM FOURTH POWER TRANSMISSION UNIT | SPOT G<br>TRANSMITTED POWER FROM FIFTH POWER TRANSMISSION UNIT | SPOT H<br>TRANSMITTED POWER FROM SIXTH POWER TRANSMISSION UNIT | SPOT I<br>TRANSMITTED POWER FROM SEVENTH POWER TRANSMISSION UNIT | SPOT J<br>TRANSMITTED POWER FROM EIGHTH POWER TRANSMISSION UNIT | SPOT K<br>TRANSMITTED POWER FROM NINTH POWER TRANSMISSION UNIT | SPOT L<br>TRANSMITTED POWER FROM TENTH POWER TRANSMISSION UNIT |
|---|---|---|---|---|---|---|---|---|---|---|
| 08:00:00 AM | 0 | 0 | 0 | 0 | 0 | 0 | 0 | 0 | 0 | 0 |
| 08:00:01 AM | 0 | 0 | 0 | 0 | 0 | 0 | 0 | 0 | 0 | 0 |
| 08:00:02 AM | 10 | 0 | 0 | 0 | 0 | 0 | 0 | 0 | 0 | 0 |
| 08:00:03 AM | 0 | 10 | 0 | 0 | 0 | 0 | 0 | 0 | 0 | 0 |
| 08:00:04 AM | 0 | 0 | 10 | 0 | 0 | 0 | 0 | 0 | 0 | 0 |
| 08:00:05 AM | 0 | 0 | 0 | 10 | 0 | 0 | 0 | 0 | 0 | 0 |
| 08:00:06 AM | 0 | 0 | 0 | 0 | 5 | 0 | 0 | 0 | 0 | 0 |
| 08:00:07 AM | 0 | 0 | 0 | 0 | 0 | 10 | 0 | 0 | 0 | 0 |
| 08:00:08 AM | 0 | 0 | 0 | 0 | 0 | 0 | 10 | 0 | 0 | 0 |
| 08:00:09 AM | 0 | 0 | 0 | 0 | 0 | 0 | 0 | 10 | 0 | 0 |
| 08:00:10 AM | 0 | 0 | 0 | 0 | 0 | 0 | 0 | 0 | 10 | 0 |
| 08:00:11 AM | 0 | 0 | 0 | 0 | 0 | 0 | 0 | 0 | 0 | 10 |
| 08:00:12 AM | 0 | 0 | 0 | 0 | 0 | 0 | 0 | 0 | 0 | 0 |

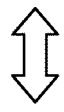

⟨TARGET VEHICLE POWER RECEIVING INFORMATION⟩

| TIME | POWER RECEIVED BY FIRST VEHICLE | POSITION INFORMATION |
|---|---|---|
| 08:00:00 AM | 0 | SPOT A |
| 08:00:01 AM | 0 | SPOT B |
| 08:00:02 AM | 10 | SPOT C |
| 08:00:03 AM | 10 | SPOT D |
| 08:00:04 AM | 10 | SPOT E |
| 08:00:05 AM | 10 | SPOT F |
| 08:00:06 AM | 5 | SPOT G |
| 08:00:07 AM | 10 | SPOT H |
| 08:00:08 AM | 10 | SPOT I |
| 08:00:09 AM | 10 | SPOT J |
| 08:00:10 AM | 10 | SPOT K |
| 08:00:11 AM | 10 | SPOT L |
| 08:00:12 AM | 0 | SPOT M |

FIFTH POWER TRANSMISSION UNIT : DROP IN FUNCTION

FIG.9

[EXAMPLE OF IMPROPER STATE OF POWER TRANSMISSION : FAILURE IN OUTPUTTING INFORMATION FROM POWER TRANSMISSION UNIT]

⟨TARGET POWER TRANSMISSION UNIT INFORMATION⟩

| INSTALLATION ZONE | SPOT C | SPOT D | SPOT E | SPOT F | SPOT G | SPOT H | SPOT I | SPOT J | SPOT K | SPOT L |
|---|---|---|---|---|---|---|---|---|---|---|
| TIME | TRANSMITTED POWER FROM FIRST POWER TRANSMISSION UNIT | TRANSMITTED POWER FROM SECOND POWER TRANSMISSION UNIT | TRANSMITTED POWER FROM THIRD POWER TRANSMISSION UNIT | TRANSMITTED POWER FROM FOURTH POWER TRANSMISSION UNIT | TRANSMITTED POWER FROM FIFTH POWER TRANSMISSION UNIT | TRANSMITTED POWER FROM SIXTH POWER TRANSMISSION UNIT | TRANSMITTED POWER FROM SEVENTH POWER TRANSMISSION UNIT | TRANSMITTED POWER FROM EIGHTH POWER TRANSMISSION UNIT | TRANSMITTED POWER FROM NINTH POWER TRANSMISSION UNIT | TRANSMITTED POWER FROM TENTH POWER TRANSMISSION UNIT |
| 08:00:00 AM | 0 | 0 | 0 | 0 | 0 | 0 | 0 | 0 | 0 | 0 |
| 08:00:01 AM | 0 | 0 | 0 | 0 | 0 | 0 | 0 | 0 | 0 | 0 |
| 08:00:02 AM | 10 | 0 | 0 | 0 | 0 | 0 | 0 | 0 | 0 | 0 |
| 08:00:03 AM | 0 | 10 | 0 | 0 | 0 | 0 | 0 | 0 | 0 | 0 |
| 08:00:04 AM | 0 | 0 | 10 | 0 | 0 | 0 | 0 | 0 | 0 | 0 |
| 08:00:05 AM | 0 | 0 | 0 | 10 | 0 | 0 | 0 | 0 | 0 | 0 |
| 08:00:06 AM | 0 | 0 | 0 | 0 | 0 | 0 | 0 | 0 | 0 | 0 |
| 08:00:07 AM | 0 | 0 | 0 | 0 | 0 | 10 | 0 | 0 | 0 | 0 |
| 08:00:08 AM | 0 | 0 | 0 | 0 | 0 | 0 | 10 | 0 | 0 | 0 |
| 08:00:09 AM | 0 | 0 | 0 | 0 | 0 | 0 | 0 | 10 | 0 | 0 |
| 08:00:10 AM | 0 | 0 | 0 | 0 | 0 | 0 | 0 | 0 | 10 | 0 |
| 08:00:11 AM | 0 | 0 | 0 | 0 | 0 | 0 | 0 | 0 | 0 | 10 |
| 08:00:12 AM | 0 | 0 | 0 | 0 | 0 | 0 | 0 | 0 | 0 | 0 |

FIFTH POWER TRANSMISSION UNIT : FAILURE IN TRANSMITTING INFORMATION

⟨TARGET VEHICLE POWER RECEIVING INFORMATION⟩

| TIME | POWER RECEIVED BY FIRST VEHICLE | POSITION INFORMATION |
|---|---|---|
| 08:00:00 AM | 0 | SPOT A |
| 08:00:01 AM | 0 | SPOT B |
| 08:00:02 AM | 10 | SPOT C |
| 08:00:03 AM | 10 | SPOT D |
| 08:00:04 AM | 10 | SPOT E |
| 08:00:05 AM | 10 | SPOT F |
| 08:00:06 AM | 10 | SPOT G |
| 08:00:07 AM | 10 | SPOT H |
| 08:00:08 AM | 10 | SPOT I |
| 08:00:09 AM | 10 | SPOT J |
| 08:00:10 AM | 10 | SPOT K |
| 08:00:11 AM | 10 | SPOT L |
| 08:00:12 AM | 0 | SPOT M |

FIG.10

[EXAMPLE OF IMPROPER STATE OF POWER TRANSMISSION : MALFUNCTION OF POWER RECEIVER]

⟨TARGET POWER TRANSMISSION UNIT INFORMATION⟩

| INSTALLATION ZONE | SPOT C | SPOT D | SPOT E | SPOT F | SPOT G | SPOT H | SPOT I | SPOT J | SPOT K | SPOT L |
|---|---|---|---|---|---|---|---|---|---|---|
| TIME | TRANSMITTED POWER FROM FIRST POWER TRANSMISSION UNIT | TRANSMITTED POWER FROM SECOND POWER TRANSMISSION UNIT | TRANSMITTED POWER FROM THIRD POWER TRANSMISSION UNIT | TRANSMITTED POWER FROM FOURTH POWER TRANSMISSION UNIT | TRANSMITTED POWER FROM FIFTH POWER TRANSMISSION UNIT | TRANSMITTED POWER FROM SIXTH POWER TRANSMISSION UNIT | TRANSMITTED POWER FROM SEVENTH POWER TRANSMISSION UNIT | TRANSMITTED POWER FROM EIGHTH POWER TRANSMISSION UNIT | TRANSMITTED POWER FROM NINTH POWER TRANSMISSION UNIT | TRANSMITTED POWER FROM TENTH POWER TRANSMISSION UNIT |
| 08:00:00 AM | 0 | 0 | 0 | 0 | 0 | 0 | 0 | 0 | 0 | 0 |
| 08:00:01 AM | 0 | 0 | 0 | 0 | 0 | 0 | 0 | 0 | 0 | 0 |
| 08:00:02 AM | 0 | 0 | 0 | 0 | 0 | 0 | 0 | 0 | 0 | 0 |
| 08:00:03 AM | 0 | 0 | 0 | 0 | 0 | 0 | 0 | 0 | 0 | 0 |
| 08:00:04 AM | 0 | 0 | 0 | 0 | 0 | 0 | 0 | 0 | 0 | 0 |
| 08:00:05 AM | 0 | 0 | 0 | 0 | 0 | 0 | 0 | 0 | 0 | 0 |
| 08:00:06 AM | 0 | 0 | 0 | 0 | 0 | 0 | 0 | 0 | 0 | 0 |
| 08:00:07 AM | 0 | 0 | 0 | 0 | 0 | 0 | 0 | 0 | 0 | 0 |
| 08:00:08 AM | 0 | 0 | 0 | 0 | 0 | 0 | 0 | 0 | 0 | 0 |
| 08:00:09 AM | 0 | 0 | 0 | 0 | 0 | 0 | 0 | 0 | 0 | 0 |
| 08:00:10 AM | 0 | 0 | 0 | 0 | 0 | 0 | 0 | 0 | 0 | 0 |
| 08:00:11 AM | 0 | 0 | 0 | 0 | 0 | 0 | 0 | 0 | 0 | 0 |
| 08:00:12 AM | 0 | 0 | 0 | 0 | 0 | 0 | 0 | 0 | 0 | 0 |

⟨TARGET VEHICLE POWER RECEIVING INFORMATION⟩

| TIME | POWER RECEIVED BY FIRST VEHICLE | POSITION INFORMATION |
|---|---|---|
| 08:00:00 AM | 0 | SPOT A |
| 08:00:01 AM | 0 | SPOT B |
| 08:00:02 AM | 0 | SPOT C |
| 08:00:03 AM | 0 | SPOT D |
| 08:00:04 AM | 0 | SPOT E |
| 08:00:05 AM | 0 | SPOT F |
| 08:00:06 AM | 0 | SPOT G |
| 08:00:07 AM | 0 | SPOT H |
| 08:00:08 AM | 0 | SPOT I |
| 08:00:09 AM | 0 | SPOT J |
| 08:00:10 AM | 0 | SPOT K |
| 08:00:11 AM | 0 | SPOT L |
| 08:00:12 AM | 0 | SPOT M |

MALFUNCTION DIAGNOSIS APPARATUS AND MALFUNCTION DIAGNOSIS METHOD FOR WIRELESS POWER TRANSMISSION SYSTEM

CROSS REFERENCE TO RELATED DOCUMENT

The present application claims the benefit of priority of Japanese Patent Application No. 2021-59970 filed on Mar. 31, 2021, the disclosure of which is incorporated in its entirety herein by reference.

TECHNICAL FIELD

This disclosure relates generally to malfunction diagnosis techniques for detecting a malfunction of a wireless power transmission system.

BACKGROUND ART

Power transmission systems are known which diagnose a malfunction thereof using data derived by measuring transmitted electrical energy. Japanese Patent First Publication No. 2016-63590 teaches a system which uses data measured by an AMI (Advanced Metering Infrastructure) to find statistical outliers to predict a malfunction of an electric distribution network.

It is also desirable for a wireless power transmission system, which wirelessly delivers electrical power from a plurality of power transmitters disposed along a road on which an automotive vehicle is traveling to a power receiver installed in the automotive vehicle, to quickly locate a portion of the wireless power transmission system which is malfunctioning.

Each of the power transmitters is usually equipped with a plurality of power transfer coils which are disposed in a surface of a road adjacent each other both in a width direction and in a length direction of the road in order to deliver electrical power to vehicles regardless of a location of each vehicle in the width direction of the road. The use of the prior art diagnosis system to detect a malfunction of the wireless power transmission system, therefore, requires installation of some kinds of sensors for each of the power transfer coils, to measure voltage at and electrical current flowing through the corresponding power transfer coil, thus resulting in an increase in total production cost of the diagnosis system and the wireless power transmission system.

SUMMARY OF THE INVENTION

According to one aspect of this disclosure, there is provided a malfunction diagnosis apparatus for diagnosing a malfunction of a wireless power transmission system including a plurality of power transmission units and a vehicle). Each of the power transmission units is equipped with a plurality of power transmitting coils. The vehicle is equipped with a power receiving coil which works to receive electric power transferred from each of the power transmission units, the malfunction diagnosis apparatus comprises: (a) an information receiver which receives power transmission unit information outputted from each of the power transmission units and the vehicle power receiving information outputted from the vehicle; and (b) a diagnostic unit which analyzes present position information about the vehicle and present position information-obtained time information about the vehicle which are included in each of pieces of vehicle power receiving information, as received by the information receiver, to identify target power transmission units that are some or all of the power transmission units which have transferred the electric power to the vehicle. The diagnostic unit works to compare between transmitted power information included in pieces of the power transmission unit information about the target power transmission units to diagnose a state of transmission of the electric power from each of the power transmission units.

The malfunction diagnosis apparatus is capable of diagnosing a malfunction of each of the power transmission units without use of a sensor installed in each of the power transmission coils, thereby enabling the wireless power transmission system to be reduced in size or production cost without sacrificing the accuracy in detecting a failure in operation of the wireless power transmission system.

According to another aspect of this disclosure, there is provided a malfunction diagnosis method for diagnosing a malfunction of a wireless power transmission system including a plurality of power transmission units and a vehicle. Each of the power transmission units is equipped with a plurality of power transmitting coils. The vehicle is equipped with a power receiving coil which works to receive electric power transferred from each of the power transmission units. The malfunction diagnosis method comprises: (a) receiving power transmission unit information outputted from each of the power transmission units and the vehicle power receiving information outputted from the vehicle; and (b) analyzing present position information about the vehicle and present position information-obtained time information about the vehicle which are included in each of pieces of vehicle power receiving information, as received by the information receiver, to identify target power transmission units that are some or all of the power transmission units which have transferred the electric power to the vehicle. The method compares between transmitted power information included in the power transmission unit information about the target power transmission units to diagnose a state of transmission of the electric power from each of the power transmission units.

The malfunction diagnosis method is capable of diagnosing a malfunction of each of the power transmission units without use of a sensor installed in each of the power transmission coils, thereby enabling the wireless power transmission system to be reduced in size or production cost without sacrificing the accuracy in detecting a failure in operation of the wireless power transmission system.

BRIEF DESCRIPTION OF THE DRAWINGS

The present disclosure will be understood more fully from the detailed description given hereinbelow and from the accompanying drawings of the preferred embodiments of the invention.

In the drawings:

FIG. 7 is an explanatory view which demonstrates an example where a power transmission unit is determined to have failed in transfer electric power;

FIG. 8 is an explanatory view which demonstrates an example where the power transmission unit is determined to have dropped in power transmitting function thereof;

FIG. 9 is an explanatory view which demonstrates an example where a power transmission unit is determined to have failed in transmitting information; and FIG. 10 is an explanatory view which demonstrates an example where a vehicle is determined to be malfunctioning.

MODE FOR CARRYING OUT THE INVENTION

A. First Embodiment

Figure 1:
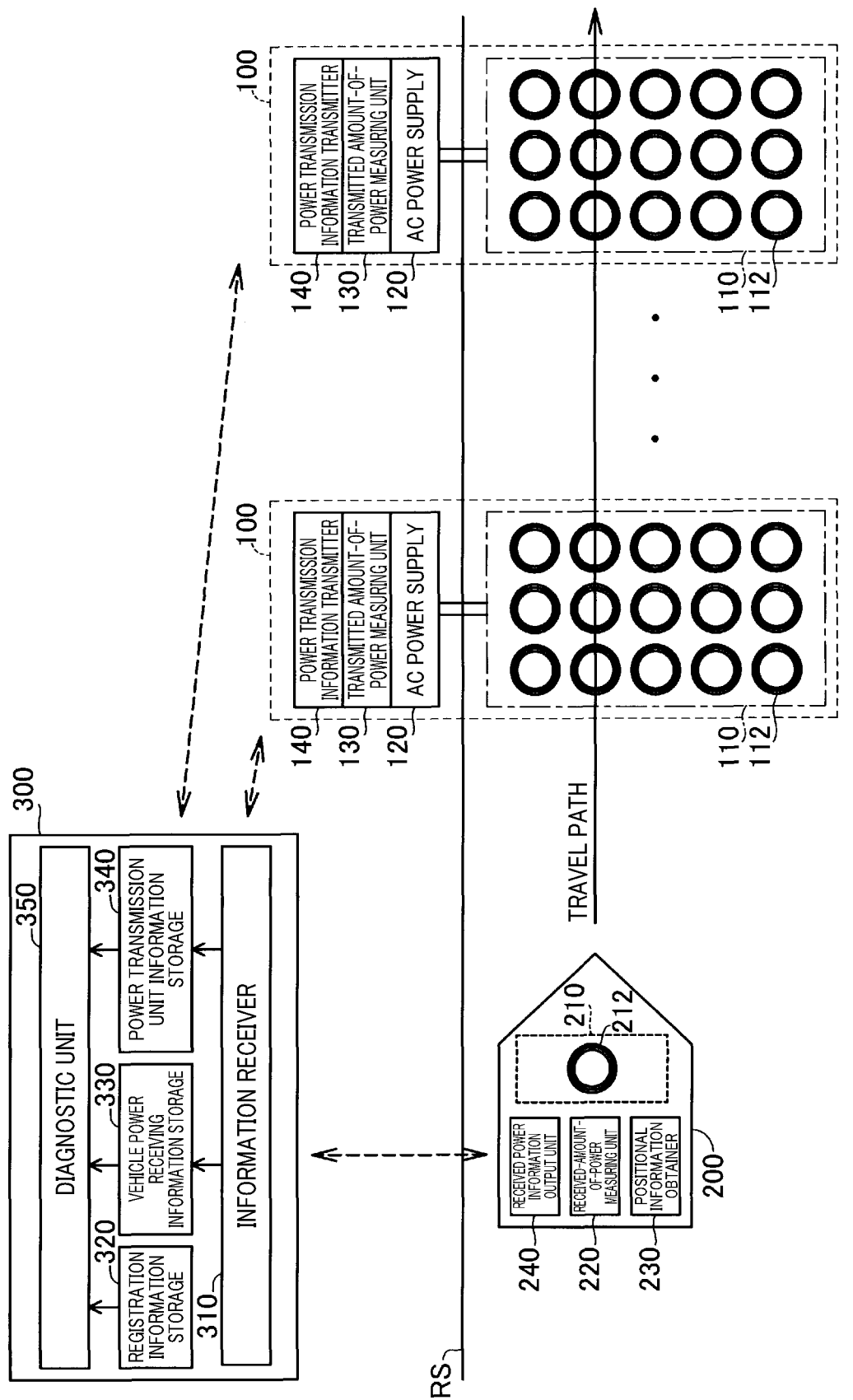
FIG. 1 is a structural view which shows a malfunction diagnosis apparatus for a wireless power transmission system.

A1 Structure of Malfunction Diagnosis Apparatus for Wireless Power Transmission System A wireless power transmission system which, as illustrated in FIG. 1, includes a plurality of power transmission units 100 and the vehicle 200 is equipped with the malfunction diagnosis apparatus 300. The power transmission units 100 are arranged adjacent each other in a traveling direction of the road RS in an installation zone on the surface of the road RS. When passing through the installation zone on the road RS, the vehicle 200 receives electric power through the power receiving unit 210, as will be described later in detail, in a wireless mode in sequence from the power transmission units 100 in an approaching order. The malfunction diagnosis apparatus 300, as will be described later in detail, receives power transmission unit information outputted from each of the power transmission units 100 and vehicle power receiving information outputted from the vehicle 200 to diagnose a malfunction or failure in transmission of electrical power between each of the power transmission units 100 and the vehicle 200.

Each of the power transmission units 100 includes the power transmitter 110, the ac power supply 120, the transmitted amount-of-power measuring unit 130, and the power transmission information transmitter 140.

The power transmitter 110 is installed in the surface of the road RS with a plurality of power transmitting coils 112 arranged adjacent each other both in a vehicle traveling direction and in a width direction of the road RS. The power transmission units 100 are arranged to have the power transmitters 110 disposed away from each other in the vehicle traveling direction within the installation zone of the surface of the road RS.

The ac power supply 120 works to apply an ac power at a power transmitting frequency to at least one of the power transmitting coils 112 which is selected to actually deliver electric power to the vehicle 200. The ac power supply 120 includes an electrical device, such as a rectifier, which converts alternating power, as delivered from a power supply installed in the wireless transmission system, to direct power and an electrical device, such as an inverter, which changes direct power to alternating power at the power transmitting frequency.

A selected one of power transmitting circuits which is equipped with the power transmitting coils 112 which are required to be coupled with the power receiving coil 212 of the vehicle 200 when an ac power transmission mode is entered will have a decreased impedance, so that ac power to be transferred to the vehicle 200 is delivered to the selected power transmitting circuit. The remaining power transmitting circuits equipped with the power transmitting coils 112 which are not required to be coupled with the power receiving coil 212 will have an increased impedance, so that ac power is delivered to them which is smaller than that in the power transmitting circuit selected to be used for transferring electrical power to the vehicle 200. Specifically, each of the ac power supplies 120 enters the ac power transmission mode to output a large amount of ac electric power when the vehicle 200 is passing over a corresponding one of the power transmitters 110. Alternatively, when the vehicle 200 is not passing over one of the power transmitters 110, the one of the power transmitters 110 is placed out of the ac power transmission mode and capable of outputting a standby ac electric power which is smaller than that in the ac power transmission mode. The ac power supplies 120 of each of the power transmission units 100 may be designed to switch between the ac power transmission mode in which electric power is delivered to the vehicle 200 and a standby mode in which no electric power is transferred to the vehicle 200 depending upon a positional relation between the vehicle 200 and a corresponding one of the power transmission units 100.

The transmitted amount-of-power measuring unit 130 of each of the power transmission units 100 measures an amount of electrical power outputted from the ac power supply 120 to the power transmitter 110 to derive transmitted power information representing the measured amount of electrical power outputted from the ac power supply 120 and transmission time information representing the time when the electric power has been outputted from the ac power supply 120. The transmitted amount-of-power measuring unit 130 may be designed to have a plurality of sensors, such as an ammeter, a voltmeter, and an electrical power meter, and a controller working to control operations of the sensors to produce the transmitted power information and the transmission time information.

The power transmission information transmitter 140 communicates with the malfunction diagnosis apparatus 300 to transfer the power transmission unit information including the transmitted power information the transmission time information to the malfunction diagnosis apparatus 300. The power transmission information transmitter 140 may be designed to communicate with the malfunction diagnosis apparatus 300 either in a wireless mode or in a wired mode.

Figure 2:
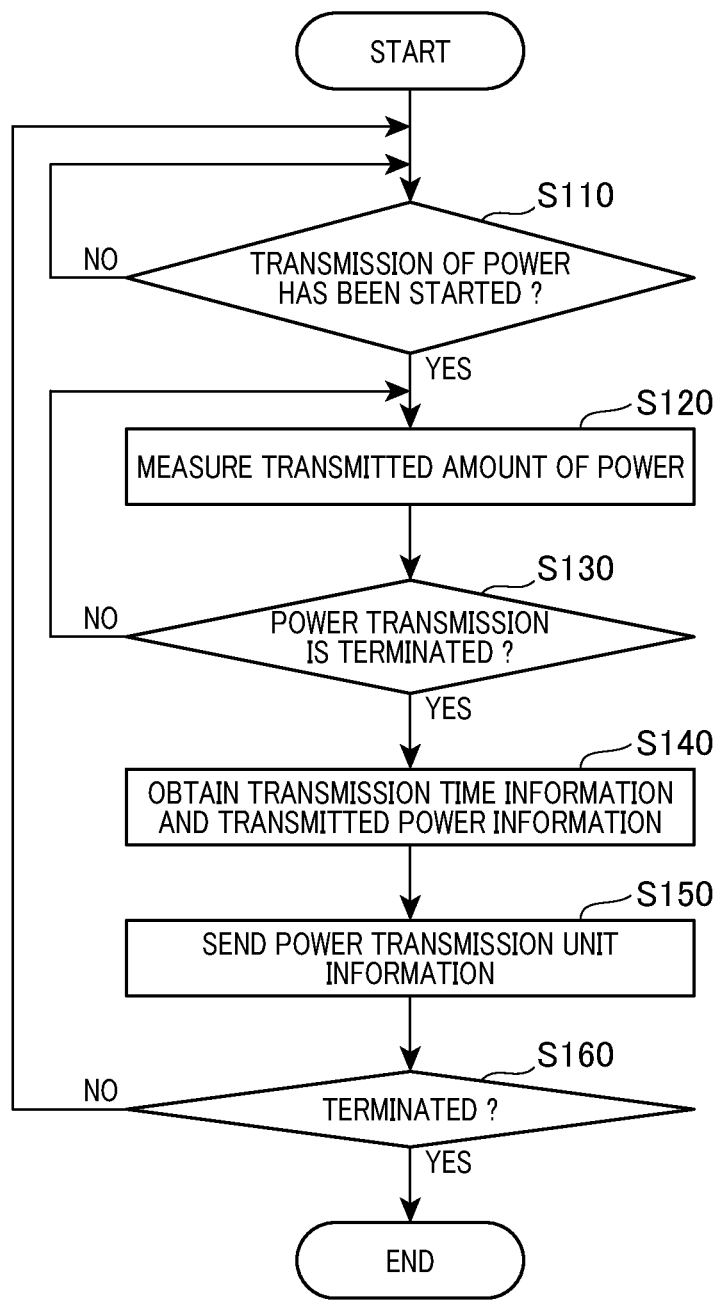
FIG. 2 is an explanatory view which shows a sequence of steps for failure diagnosis of power transmission units.

Each of the power transmission units 100 works to execute a sequence of steps or program illustrated in FIG. 2 to send the power transmission unit information to the malfunction diagnosis apparatus 300. The program in FIG. 2 is initiated upon turning on of the power transmission unit 100 and terminated in response to an instruction provided by the power transmission unit 100. The program is executed cyclically until a YES answer is obtained in step S160.

First, in step S110, the transmitted amount-of-power measuring unit 130 is placed in a standby mode until electrical energy or power starts to be transmitted to the vehicle 200. The power transmission is determined to have been started when a change in output of the ac power supply 120 from a standby power to a transmission power (i.e., electrical energy required to be transferred from the power transmission unit 100). The change from the standby power to the transmission power may be detected by monitoring an event where an amount of electric power higher than a given value is generated. The ac power supply 120 may be switched between an on-mode (i.e., the power transmission mode) and an off-mode (i.e., the standby mode) depending upon a positional relation between the vehicle 200 and the power transmission unit 100. In such a case, the start of power transmission may be determined to be initiated upon the switching from the off-mode to the on-mode.

If a YES answer is obtained in step S110 meaning that the transmission of power has been started, then the routine proceeds to step S120 wherein the transmitted amount-of-power measuring unit 130 measures transmitted electrical power to calculate an amount of electrical power transmitted to the vehicle 200 until the transmission of power is terminated, that is, a NO answer is obtained in step S130. The transmitted amount of electrical power is expressed by a total amount of electrical power between the start and termination of power transmission. The transmitted amount-of-power measuring unit 130 may alternatively be designed to calculate, instead of the total transmitted amount of power, an amount of electrical power per unit time derived by dividing the total transmitted amount of power by a length of time between the start and termination of power transmission (which will also be referred to as a power transmission duration). The termination of power transmission may be detected to have occurred when the output of the ac power supply 120 is returned from the transmission power to the standby power or alternatively when the ac power supply 120 is switched from the on-mode to the off-mode in a case where the ac power supply 120 is designed to be switched between the on-mode and the off-mode depending upon the positional relation between the vehicle 200 and the power transmission unit 100.

If a YES answer is obtained in step S130 meaning that the power transmission is terminated, then the routine proceeds to step S140 wherein the transmitted amount-of-power measuring unit 130 obtains the transmission time information representing the time of the transmission of electrical power to the vehicle 200 and the transmitted power information representing the amount of electrical power transmitted to the vehicle 200. The routine then proceeds to step S150 wherein the power transmission information transmitter 140 sends the transmission time information and the transmitted power information, as obtained by the transmitted amount-of-power measuring unit 130, and the identification information representing the identification of one of the power transmission units 100 which was used in transferring the electrical power to the vehicle 200 to the malfunction diagnosis apparatus 300 as the power transmission unit information. The transmission time information is produced as representing the time when the power transmission has been terminated, but however, may alternatively indicate the time when the power transmission has started, both the times when the power transmission has been started and terminated, or both the time when the power transmission has been started and the power transmission duration.

With the above operations, each of the power transmission units 100 works to measure the amount of electrical energy transferred therefrom and output the power transmission unit information each time the power transmission task is executed between the turning on and off thereof.

The vehicle 200 is, as can be seen in FIG. 1, equipped with the power receiving unit 210, the received-amount-of-power measuring unit 220, the positional information obtainer 230, and the received power information output unit 240.

The power receiving unit 210 includes the power receiving coil 212. When the power transmitting coils 112 and the power receiving coil 212 are magnetically coupled together, it will cause the power receiving coil 212 to receive an induced ac power. The ac power received by the power receiving coil 212 is converted by a power receiving circuit, not shown, into dc power which will be charged into a storage battery, not shown, mounted in the vehicle 200. The battery works to deliver electric power to electrical devices, such as a drive motor(s), a variety of meters, and various electrical components, installed in the vehicle 200.

The received-amount-of-power measuring unit 220 works to measure an amount of electric power received by the power receiving unit 210 to provide received-amount-of-power information indicating it. The received-amount-of-power measuring unit 220 is made of a device which controls operations of sensors, such as an ammeter, a voltmeter, and a wattmeter, to produce the received-amount-of-power information. The amount of electric power measured by the received-amount-of-power measuring unit 220 may be expressed by the amount of ac power received by the power receiving coil 212 or the amount of dc power into which the ac power is converted.

The positional information obtainer 230 works to derive present position information representing a present position of the vehicle 200 and present position information-obtained time information representing the time when the present position information is derived. The positional information obtainer 230 is implemented by, for example, a GNSS (Global Navigation Satellite System). The present position information and the present position information-obtained time information may be derived at all times or at a time when the received-amount-of-power measuring unit 220 calculates the amount of electric power received by the power receiving unit 210.

In operation, the received power information output unit 240 communicates with the malfunction diagnosis apparatus 300 to output the vehicle power receiving information including the present position information, the present position information-obtained time information, and the received-amount-of-power information to the malfunction diagnosis apparatus 300. The received power information output unit 240 and the malfunction diagnosis apparatus 300 communicate with each other in a wireless mode, but however, the received power information output unit 240 may alternatively communicate wirelessly with an access point which is connected to the malfunction diagnosis apparatus 300 in a wired mode.

Figure 3:
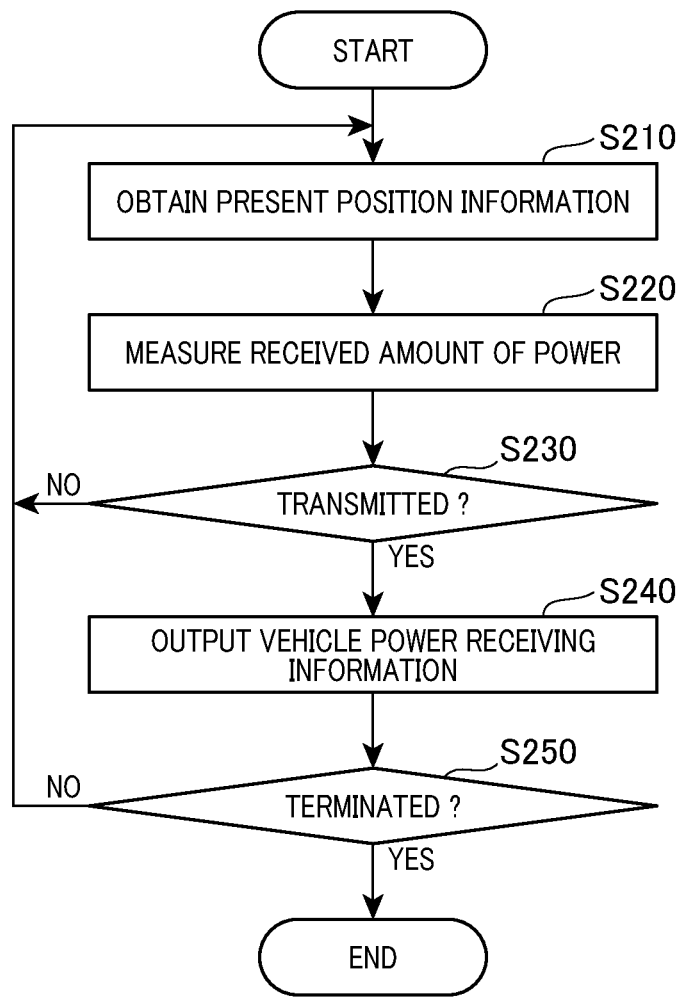
FIG. 3 is an explanatory view which shows a sequence of steps for failure diagnosis of a vehicle.

The vehicle 200 executes an information transmitting task or program shown in FIG. 3 to send the vehicle power receiving information to the malfunction diagnosis apparatus 300. The program in FIG. 3 is initiated upon start of the vehicle 200 and executed cyclically until a program terminating instruction is received, that is, a YES answer is obtained in step S250.

After entering the program in FIG. 3, the routine proceeds to step S210 wherein the positional information obtainer 230 acquires the present position information indicating the present position of the vehicle 200 and also derives the present position information-obtained time information indicating the time when the present position information has been acquired. The routine proceeds to step S220 wherein the received-amount-of-power measuring unit 220 calculates the amount of electric power received by the power receiving unit 210 and provides the received-amount-of-power information representing the calculated amount of electric power. The operation in step S210 may alternatively be executed following that in step S220. The operations in steps S210 and S220 may alternatively be executed in parallel to each other. The amount of electric power received by the power receiving unit 210 is defined as a received amount of electric power per unit time within a period of time in which step S220 is performed.

The routine proceeds to step S230 wherein the received power information output unit 240 determine whether a condition is met wherein the vehicle power receiving information should be outputted. Specifically, it is determined whether the position of the vehicle 200 indicated by the present position information lies in the installation zone in which the power transmission units 100 are arranged by analyzing map data stored in the positional information obtainer 230. If a NO answer is obtained in step S230 meaning that the present position of the vehicle 200 is not in the installation zone, the routine returns back to step S210. Alternatively, if a YES answer is obtained meaning that the present position of the vehicle 200 lines in the installation zone, it is concluded that the condition is met to output the vehicle power receiving information.

If a NO answer is obtained in step S230 meaning that the condition is not met to output the vehicle power receiving information, the positional information obtainer 230 performs the operation in step S210 again. The received-amount-of-power measuring unit 220 performs the operation in step S220 again. If a YES answer is obtained in step S230, then the routine proceeds to step S240 wherein the received power information output unit 240 outputs the present position information, the present position information-obtained time information, and the received-amount-of-power information to the malfunction diagnosis apparatus 300 as the vehicle power receiving information.

With the above operations, the vehicle 200 works to obtain the position information and measure a received amount of electrical power for a period of time between start and termination of operation of the vehicle 200. When the condition is encountered to transmit the vehicle power receiving information, the vehicle 200 outputs the vehicle power receiving information.

The malfunction diagnosis apparatus 300 works to receive the power transmission unit information, as transmitted from each of power transmission units 100 (not shown in the drawings) as well as the power transmission units 100 in the installation zone demonstrated in FIG. 1, and also receive the vehicle power receiving information, as transmitted from each of various kinds of automotive vehicles as well as the vehicle 200 illustrated in FIG. 1 passing through the installation zone, to diagnose the state of communication between each vehicle and a corresponding one of the power transmission units 100. The malfunction diagnosis apparatus 300 is made of a computer, such as a server.

The malfunction diagnosis apparatus 300, as can be seen in FIG. 1, includes the information receiver 310, the registration information storage 320, the vehicle power receiving information storage 330, the power transmission unit information storage 340, and the diagnostic unit 350.

The information receiver 310 is a communication unit designed to achieve communication with each of power transmission units 100 (disposed in installation zones not shown in the drawings) as well as the power transmission units 100 in the installation zone demonstrated in FIG. 1, and receive the power transmission unit information, as transmitted from a corresponding one of the power transmission units 100. The information receiver 310 is also designed to achieve communication with each automotive vehicle, not shown, passing through another installation zone or the vehicle 200 passing through the installation zone illustrated in FIG. 1 and receive the vehicle power receiving information outputted therefrom. The communication with each of the power transmission units 100 or each of the vehicles is achieved in the same way as the power transmission information transmitters 140 of the power transmission units 100 or the received power information output unit 240 of the vehicle 200.

The power transmission unit information storage 340 stores pieces of the power transmission unit information received in sequence. The vehicle power receiving information storage 330 stores pieces of the vehicle power receiving information received in sequence. The registration information storage 320 pre-stores identifications used to identify the power transmission units 100 as targets to be diagnosed and location data representing locations of the power transmission units 100.

The diagnostic unit 350 identifies the power transmission units 100 which have delivered electrical power to one of the vehicles (i.e., the vehicle 200) from which the vehicle power receiving information has been received, and compares each of pieces of the power transmission unit information outputted from the identified power transmission units 100 with a corresponding one of pieces of the vehicle power receiving information to diagnose the state of transmission of electric power between each of the power transmission units 100 and the vehicle 200.

Figure 4:
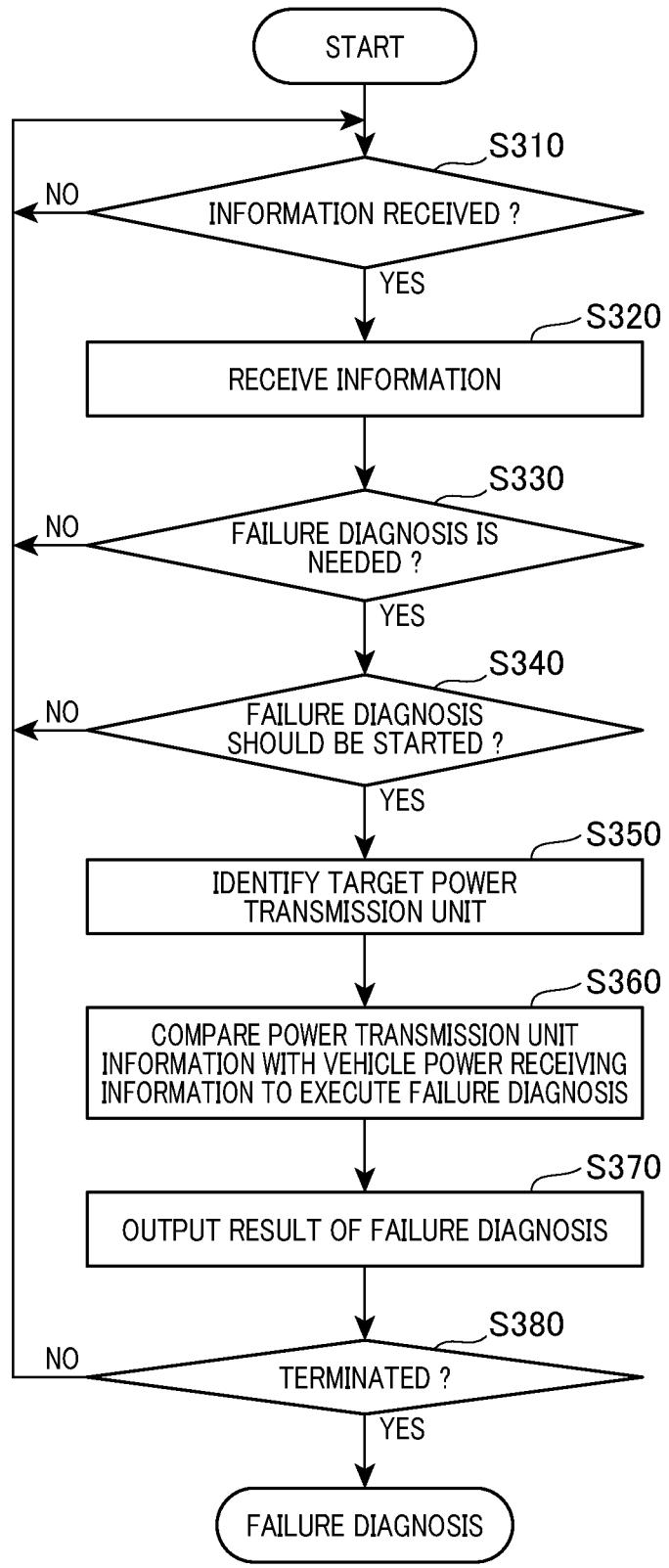
FIG. 4 is an explanatory view which shows a sequence of steps for failure diagnosis in a malfunction diagnosis apparatus.

Specifically, the malfunction diagnosis apparatus 300 executes a sequence of logical steps or program illustrated in FIG. 4 to receive the power transmission unit information and the vehicle power receiving information to identify some of the power transmission units 100 which have transferred electrical power to one of the vehicles (i.e., the vehicle 200) from which the vehicle power receiving information has been received. The malfunction diagnosis apparatus 300 compares each of pieces of the power transmission unit information about the identified power transmission units 100 with a corresponding one of pieces of the vehicle power receiving information to diagnose the state of communication therebetween. The program in FIG. 4 is initiated upon start of the malfunction diagnosis apparatus 300 and executed in a cycle until an instruction to terminate the program is issued, that is, a YES answer is obtained in step S380.

First, in step S310, the information receiver 310 determines whether information has been received from any of the power transmission units 100 or the vehicle 200. If a YES answer is obtained, then the routine proceeds to step S320 wherein the information receiver 310 receives pieces of the information and stores them in sequence in corresponding storages. Specifically, the pieces of the power transmission unit information are retained in the power transmission unit information storage 340. The pieces of the vehicle power receiving information are retained in the vehicle power receiving information storage 330.

The routine proceeds to step S330 wherein the diagnostic unit 350 determines whether a failure diagnosis is needed. For instance, when the vehicle power receiving information is received from the vehicle 200 traveling in the installation zone, and the amount of electric power received by the vehicle 200 indicated by the received-amount-of-power information included in the vehicle power receiving information is lower than a given threshold value, the diagnostic unit 350 determines that there is a need for the failure diagnosis. The given threshold value is selected to be lower than a rated value, in other words, low enough to determine that the amount of electric power received by the vehicle 200 is improper.

If a NO answer is obtained in step S330 meaning that there is no need for the failure diagnosis, then the routine returns back to step S310. Alternatively, if a YES answer is obtained in step S330, then the routine proceeds to step S340 wherein the diagnostic unit 350 determines whether the failure diagnosis should be initiated. Specifically, when the vehicle power receiving information which is transmitted from the vehicle 200 passing through the installation zone has been received in a given period of time after it is determined in step S330 that there is a need for the failure diagnosis, the diagnosis unit 350 determines that the failure diagnosis should be initiated. This determination may be made by comparing the present position of the vehicle 200, as indicated by the present position information included in the vehicle power receiving information, with the location of a corresponding one of the power transmission units 100 which is registered in the registration information storage 320. The given period of time is, for instance, set to a length of time at least required to derive items or pieces of the power transmission unit information for comparison with pieces of the vehicle power receiving information.

If a NO answer is obtained in step S340 meaning that the failure diagnosis should not be initiated, then the routine returns back to step S310. Alternatively, if a YES answer is obtained, then the routine proceeds to step S350 wherein the diagnostic unit 350 identifies one of the power transmission units 100 as a target power transmission unit through which one of the vehicles (which will also be referred to as the target vehicle 200) has passed which has transmitted the vehicle power receiving information and also has been determined as being required to be diagnosed. The routine then proceeds to step S360 wherein the diagnostic unit 350 compares the power transmission unit information, as transmitted by the target power transmission unit 100, with the vehicle power receiving information about the target vehicle 200 to execute the failure diagnosis. The routine proceeds to step S370 wherein a result of the failure diagnosis is outputted. For instance, the result of the failure diagnosis is indicated on a display, not shown, installed in the malfunction diagnosis apparatus 300. The result of the failure diagnosis may also be transmitted to a terminal device of an administrator or operator of the malfunction diagnosis apparatus 300 through a network, not shown. When the state of transmission of electric power to the target vehicle 200 is determined to have failed, this fact may also be transmitted to a terminal device of an administrator or operator of the power transmission units 100 through a network, not shown. When a failure in receiving the electric power is determined to have occurred in the target vehicle 200, this fact may be transmitted to the target vehicle 200 through a network, not shown.

The malfunction diagnosis apparatus 300 for the wireless power transmission system, as described above, works to analyze the present position information and the present position information-obtained time information included in the vehicle power receiving information outputted from the vehicle 200 to identify some of the power transmission units 100 which have transferred electric power to the vehicle 200 and compare the transmitted power information included in the power transmission unit information outputted from the identified power transmission units 100 with the received-amount-of-power information included in the vehicle power receiving information about the vehicle 200 to diagnose the state of transmission of electric power from each of the identified power transmission units 100 to the vehicle 200. This enables each of the power transmission units 100 to be diagnosed to detect a failure in transferring electric power to the vehicle 200 without need for sensors one for each of the power transmitting coils 112, thereby enabling the malfunction diagnosis apparatus 300 to be reduced in size or production cost without sacrificing the accuracy in detecting a failure in operation of the wireless power transmission system.

A2 Malfunction Diagnosis

An example of failure diagnosis made by the diagnostic unit 350 will be described below. For the simplicity of explanation of the failure diagnosis, it is assumed, as demonstrated in FIG. 5, that the power transmission units 100 are disposed at spots C to L that are ten of spots A to M defined on the road RS, and that the vehicle 200 has passed through the spots C to L. For the brevity of disclosure, the power transmission units 100 arranged at the spots C to L will also be referred to below as the first power transmission unit, the second power transmission unit . . . and the tenth power transmission unit. The vehicle 200 will also be referred to as a first vehicle, a second vehicle . . . or a tenth vehicle.

Example of Proper Operation

Figure 5:
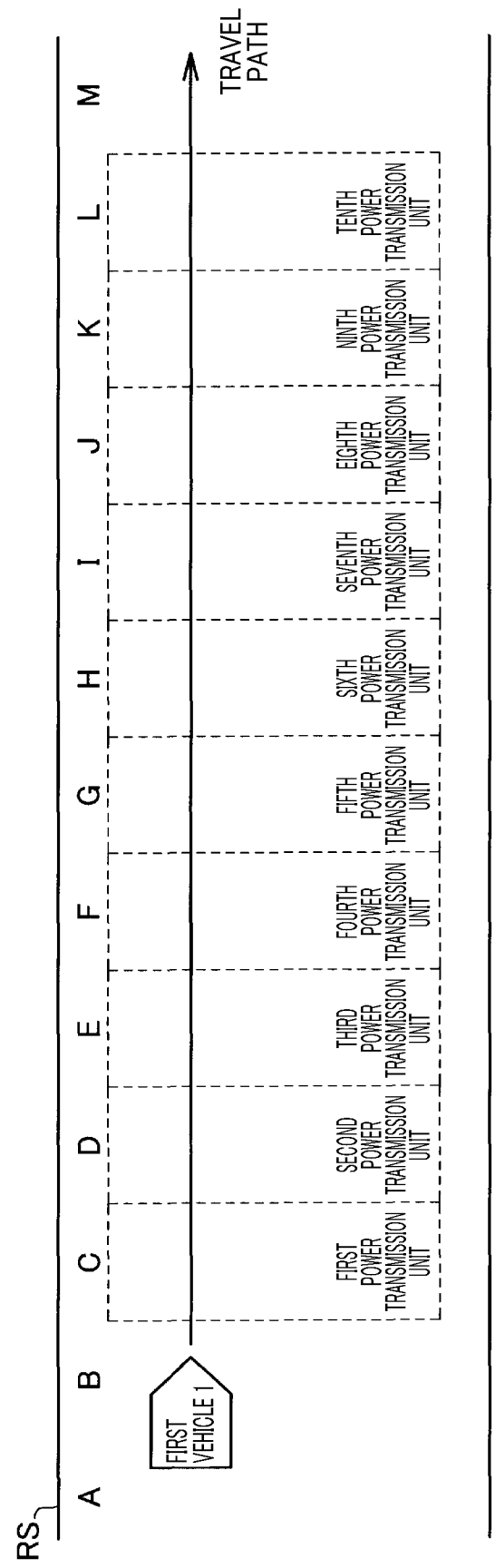
FIG. 5 is an explanatory view which demonstrates an example of layout of power transmission units for explanation of failure diagnosis.

When the state of transmission of electric power from each of the first power transmission unit to the tenth power transmission unit to the first vehicle is, as demonstrated in FIG. 5, is proper, the failure diagnosis illustrated in FIG. 4 is not executed for minimizing an operation load on the malfunction diagnosis apparatus 300. In order to facilitate better understanding of an improper state of transmission of electric power to the vehicle 200, the proper transmission of electric power from each of the first power transmission unit to the tenth power transmission unit to the first vehicle will first be described.

Figure 6:
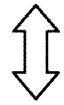
FIG. 6 is an explanatory view which demonstrates an example where there is no malfunction.

FIG. 6 shows comparison between the vehicle power receiving information about the first vehicle and the power transmission unit information about the target power transmission unit which is identified by the vehicle power receiving information about the first vehicle when electric power is properly transferred from each of the power transmission units 100 to the first vehicle traveling in the installation zone. The right side of FIG. 6 represents the time at which electric power is received by the first vehicle, the position of the first vehicle at that time, and the amount of electric power received by the first vehicle at that time which are derived from the vehicle power receiving information about the first vehicle. The left side of FIG. 6 represents the amounts of electric power transmitted from the power transmission units 100 at times, as enclosed by the cells marked with bold borders (expressed by the power transmission unit information), to the vehicle 200 traveling through the spots C to L. The amounts of electric power transmitted from each of the power transmission units 100 and received by the vehicle 200 are indicated by numeral values relative to 10 (i.e., 10 units of electric power) defined as representing a corresponding rated value when the state of transmission of electric power is proper. An actual transmitted or received amount of electric power usually depends upon environmental or other conditions even when the state of transmission or reception of electric power is proper, but however, a variation in actual transmitted or received amount of electric power is usually negligibly small enough to facilitate understanding of the failure diagnosis. The following discussion will be made assuming that the transmitted or received amount of electric power is denoted by "10" (i.e., 10 units of electric power) when the state of transmission or reception of electric power is proper. The transmitted amounts of electric power at times shown outside the cells marked with bold borders indicated by "0" (i.e., 0 units of electric power) because the power transmission unit information is not outputted from the power transmission units 100 when there is no need for transmitting electric power to the vehicle 200.

The first vehicle, as demonstrated in FIG. 6, passes sequentially through the first power transmission unit to the tenth power transmission unit at an interval of one second between 08:00:02 AM to 08:00:11 AM. Each of the first power transmission unit to the tenth power transmission unit works to deliver the amount of electric power of "10" (i.e., 10 units of electric power) to the first vehicle each time the first vehicle passes through a corresponding one of the first to tenth power transmission units. The first vehicle receives the amount of electric power of "10" (i.e., 10 units of electric power) sequentially from the first to tenth power transmission units. The information shown in FIG. 6 represents the fact that the state of transmission of electric power from each of the first to tenth power transmission unit to the first vehicle is proper.

Example of Failure in Power Transmission Mode: Malfunction of Power Transmission Unit An example where one of the power transmission units 100 is malfunctioning, thus resulting in a failure in transmitting electric power to the first vehicle will be described below as an example of a failure in power transmission mode. FIG. 7 shows comparison between the vehicle power receiving information about the first vehicle and the power transmission unit information about the target power transmission unit which is identified by the vehicle power receiving information about the first vehicle when the fifth power transmission unit is malfunctioning, thus resulting in improper transmission of electric power to the first vehicle passing through the spot G.

The first vehicle, as demonstrated in FIG. 7, passes sequentially through the first power transmission unit to the tenth power transmission unit at an interval of one second between 08:00:02 AM to 08:00:11 AM. The amount of electric power transmitted from the fifth power transmission unit and the amount of electric power received by the first vehicle at 08:00:06 AM are shown as 0 units of electric power in the cells marked with bold dashed borders. Pieces of information, as enclosed by rectangular thick solid lines within a frame expressed by a thick chain line, about the amounts of electric power transmitted from some of the power transmission units 100 thought which the first vehicle has passed in a given period of time across the time when the first vehicle has passed through the fifth power transmission unit may be used to execute the failure diagnosis, thereby minimizing the volume of information used for the failure diagnosis. In the illustrated example, the malfunction diagnosis apparatus 300 compares pieces of information about the third and fourth power transmission units preceding the fifth power transmission unit, pieces of information about the sixth and seventh power transmission units following the fifth transmission unit, and a piece of information about the fifth power transmission unit with each other. The amount of electric power transmitted from the third, fourth, sixth, and seventh power transmission units preceding and following the fifth power transmission unit are all expressed by "10" (i.e., 10 units of electric power). The amount of electric power received by the first vehicle from each of the third, fourth, sixth, and seventh power transmission units is also expressed in 10 units of electric power. The amount of electric power transferred from the fifth power transmission unit to the first vehicle is expressed in 0 units of electric power. The amount of electric power received by the first vehicle from the fifth power transmission unit is also expressed in 0 units of electric power. The diagnostic unit 350, therefore, determines that the state of transmission of electric power from the fifth power transmission unit to the first vehicle is improper, that is, that a power transmission mechanism of the fifth power transmission unit is malfunctioning. The failure diagnosis in the above discussion is made using pieces of the information derived in a given period of time preceding and following the time when the first vehicle passes through the fifth power transmission unit which is malfunctioning in order to minimize the volume of the information used for the failure diagnosis, but however, it may be achieved without setting limits on the volume of the information. The same applies to the following discussion. The malfunction of the power transmission mechanism includes at least one of failures in operation of the ac power supply 120 and the power transmitter 110.

Example of Failure in Power Transmission Mode: Reduction in Function of Power Transmission Unit An example where one of the power transmission units 100 is reduced in power transmitting function will be described below as an example of a failure in power transmission mode. FIG. 8 shows comparison between the vehicle power receiving information about the first vehicle and the power transmission unit information about the target power transmission unit which is identified by the vehicle power receiving information about the first vehicle when the fifth power transmission unit is reduced in power transmitting function thereof, thus resulting in improper transmission of electric power to the first vehicle passing through the spot G.

The first vehicle, as demonstrated in FIG. 8, passes sequentially through the first power transmission unit to the tenth power transmission unit at an interval of one second between 08:00:02 AM to 08:00:11 AM. The amount of electric power transmitted from the fifth power transmission unit and the amount of electric power received by the first vehicle at 08:00:06 AM are both shown as 5 units of electric power in the cells marked with bold dashed borders. Pieces of information, as enclosed by rectangular thick chain lines, about the amounts of electric power transmitted from some of the power transmission units 100 thought which the first vehicle has passed in a given period of time across the time when the first vehicle has passed through the fifth power transmission unit may be used to execute the failure diagnosis. The amount of electric power transmitted from the third, fourth, sixth, and seventh power transmission units preceding and following the fifth power transmission unit are all expressed by 10 units of electric power. The amount of electric power received by the first vehicle from each of the third, fourth, sixth, and seventh power transmission units is also expressed by 10 units of electric power. The amount of electric power transferred from the fifth power transmission unit to the first vehicle is expressed by 5 units of electric power. The amount of electric power received by the first vehicle from the fifth power transmission unit is also expressed by 5 units of electric power. In the illustrated example, an average of the amounts of electric power transmitted to the first vehicle in the above given period of time corresponds to 9 units, while the amount of electric power transmitted from the fifth power transmission unit corresponds to 5 units which is much lower than the average of 9 units. The amount of electric power transmitted from the fifth power transmission unit is lower than a functional drop reference value (e.g., average−Δ=7) where Δ is, for example, "2" arising from a drop in function of the power transmission units 100. The diagnostic unit 350, therefore, determines that the state of transmission of electric power from the fifth power transmission unit to the first vehicle is improper, specifically, the function of the power transmitting mechanism of the fifth power transmission unit has dropped, which will lead to a risk of a malfunction of the fifth power transmission unit. The drop in function includes a failure in transmitting electric power to the first vehicle which is caused by wire breakage or wire disconnection of a given number of the power transmitting coils 112 installed in the fifth power transmission unit, aging of the power transmitting coils 112, or reduction in function of the ac power supply 120.

Example of Failure in Power Transmission Mode: Failure in Transmitting Power Transmission Unit Information An example where the state of transmission of the power transmission unit information to the malfunction diagnosis apparatus 300 is improper will be described below as an example of a failure in power transmission mode. FIG. 9 shows comparison between the vehicle power receiving information about the first vehicle and the power transmission unit information about the target power transmission unit which is identified by the vehicle power receiving information about the first vehicle when a failure has occurred in transmitting the information from the fifth power transmission unit to the malfunction diagnosis apparatus 300, which causes the state of transmission of electric power from the fifth power transmission unit to the first vehicle to be determined as being improper.

The first vehicle, as demonstrated in FIG. 9, passes sequentially through the first power transmission unit to the tenth power transmission unit at an interval of one second between 08:00:02 AM to 08:00:11 AM. The amount of electric power transmitted from the fifth power transmission unit at 08:00:06 AM is shown as 0 units of electric power in the cells marked with hold dashed borders. Pieces of information, shown in the cells marked with bold borders within a frame expressed by a thick chain line, about the amounts of electric power transmitted from some of the power transmission units 100 thought which the first vehicle has passed in a given period of time across the time when the first vehicle has passed through the fifth power transmission unit may be used to execute the failure diagnosis. The amount of electric power transmitted from the third, fourth, sixth, and seventh power transmission units preceding and following the fifth power transmission unit are all shown as 10 units of electric power. The amount of electric power received by the first vehicle from each of the third, fourth, sixth, and seventh power transmission units is also shown as 10 units of electric power. This fact shows a risk that the state of transmission of electric power from the fifth power transmission unit may be improper. The amount of electric power received by the first vehicle at 08:00:06 AM at which the fifth power transmission unit must have transferred electric power to the first vehicle is, however, shown as units of electric power in the cell marked with a bold dashed border, which means that the first vehicle properly has received electric power, that is, that the fifth power transmission properly has transmitted electric power to the first vehicle. The diagnostic unit 350, therefore, concludes that the fact that the fifth power transmission unit is determined as having failed in transmitting electric power to the first vehicle has arisen from a malfunction of an information transmitting mechanism of the fifth power transmission unit.

Example of Failure in Power Transmission Mode: Malfunction of Power Receiver

An example where the vehicle 200 is malfunctioning will be described below as an example of a failure in power transmission mode. FIG. 10 shows comparison between the vehicle power receiving information about the first vehicle and the power transmission unit information about the target power transmission unit which is identified by the vehicle power receiving information about the first vehicle when a failure has been occurred in transmission of electric power from each of the power transmission units 100 to the vehicle 200 passing through a corresponding one of the power transmission units 100.

The first vehicle, as demonstrated in FIG. 10, passes sequentially through the first power transmission unit to the tenth power transmission unit at an interval of one second between 08:00:02 AM to 08:00:11 AM. The amount of electric power received by the first vehicle from each of the first power transmission unit to the tenth power transmission unit is expressed in 0 units of electric power. The amount of electric power transmitted from each of the first power transmission unit to the tenth power transmission unit is, as shown in the cell marked with a bold border, also expressed in 0 units of electric power. The diagnostic unit 350 is, therefore, capable of detecting a failure in operation of a receiver (i.e., the first vehicle) or a transmitter (i.e., each of the first to tenth power transmission units), but unable to identify which of the receiver and the transmitter(s) is (are) malfunctioning.

In order to alleviate the above problem, the diagnostic unit 350 monitors the state of reception of electric power in the second vehicle following the first vehicle to determine whether a malfunction has occurred in the receiver (i.e., the first vehicle) or the transmitters (i.e., the first to tenth power transmission units).

For instance, when the state of reception of electric power in the second vehicle passing through each of the first to tenth power transmission units following the first vehicle is proper (see FIG. 6), the diagnostic unit 350 determines that a power receiving mechanism or an information transmitting mechanism to transmit the vehicle power receiving information is malfunctioning in the first vehicle. When the state of reception of electric power in the second vehicle is, like the first vehicle, improper (see FIG. 10), the diagnostic unit 350 may determine that the power transmitting mechanism of each of the first to tenth power transmission units is malfunctioning.

The above-described examples of the failure diagnosis have referred to the diagnosis of state of transmission of electric power between the vehicle 200 and each of the power transmission units 100 arranged in the single installation zone through which the vehicle 200 passes. The failure diagnosis may also be made for another vehicle traveling in the installation zone or passing through another installation zone.

B Other Embodiments

In the above embodiments, the transmission of the vehicle power receiving information from the vehicle 200 to the malfunction diagnosis apparatus 300 is made when the vehicle 200 exists in the installation zone where the power transmission units 100 are installed (see step S230 in FIG. 3), but however, it may be achieved at all times regardless of the present position of the vehicle 200. In this case, the vehicle power receiving information may include power reception enable information which represents whether the vehicle 200 is now within the installation zone, so that it is capable of receiving the electric power. This enables the malfunction diagnosis apparatus 300 to determine whether the failure diagnosis should be executed (see step S330 in FIG. 4) using a received amount of electric power, as indicated by the vehicle power receiving information received when the vehicle 200 is enabled to receive the electric power, to initiate the failure diagnosis.

In the above embodiments, the diagnostic unit 350 of the malfunction diagnosis apparatus 300 starts to execute the failure diagnosis in a condition where the vehicle power receiving information has been received in a given period of time after it is determined that there is a need for the failure diagnosis, but however, the failure diagnosis may be initiated when pieces of the vehicle power receiving information have been received from all the power transmission units 100 during passage of the vehicle 200 through the installation zone.

The operations of each controller referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controllers or operations may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the controller need not necessarily include software, but may be realized one or a plurality of hardware devices.

The present disclosure has been described above on the basis of embodiments and modifications, but the embodiments of the invention described above are for facilitating the understanding of the present disclosure and do not limit the present disclosure. The present disclosure can be modified and improved without departing from the drift and the scope of the claims, and the present disclosure include equivalents thereof.

What is claimed is:

1. A malfunction diagnosis apparatus for diagnosing a malfunction of a wireless power transmission system including a plurality of power transmission units and a vehicle, each of the power transmission units being equipped with a plurality of power transmitting coils, the vehicle being equipped with a power receiving coil which works to receive electric power transferred from each of the power transmission units, the malfunction diagnosis apparatus comprising:
   an information receiver which receives (a) power transmission unit information outputted from each of the power transmission units and (b) vehicle power receiving information outputted from the vehicle; and
   a diagnostic unit which:
   (a) analyzes present position information about the vehicle and present position information-obtained time information about the vehicle which are included in each of pieces of vehicle power receiving information, as received by the information receiver, to identify target power transmission units that are some or all of the power transmission units which have transferred the electric power to the vehicle,
   (b) compares between transmitted power information included in pieces of the power transmission unit information about the target power transmission units, and
   (c) based on the comparing, diagnoses a state of transmission of the electric power from each of the power transmission units, wherein a failure diagnosis for a unit of the power transmission units is determined by the vehicle passing sequentially through the power transmission units, and the vehicle passing through a spot corresponding to the unit of the power transmission units receives improper power transmission of electric power, the improper transmission of electric power determined based on the comparing.

2. The malfunction diagnosis apparatus as set forth in claim 1, wherein the diagnostic unit compares the transmitted power information included in the power transmission unit information about a malfunctioning power transmission unit that is one of the power transmission units from which the state of transmission of the electric power is determined to be improper with received-amount-of-power information included in vehicle power receiving information about the vehicle to determine whether a failure in operation of the malfunctioning power transmission unit results in the state of transmission of the electric power being improper.

3. The malfunction diagnosis apparatus as set forth in claim 2, wherein when an amount of electric power transmitted from one of the power transmission units is zero, the diagnostic unit determines that the one of the power transmission units is malfunctioning, and when an amount of electric power transmitted from one of the power transmission units is lower than a functional drop reference value, the diagnostic unit determines that a failure in operation of the one of the power transmission units arises from a drop in function thereof.

4. The malfunction diagnosis apparatus as set forth in claim 1, wherein when the vehicle which has passed through the power transmission units have received no electric power, the diagnostic unit determines whether the vehicle is malfunctioning using a state of reception of electric power in a second vehicle which has passed the power transmission units in a given period of time preceding and following a time when the vehicle has passed the power transmission units.

5. A malfunction diagnosis method for diagnosing a malfunction of a wireless power transmission system including a plurality of power transmission units and a vehicle, each of the power transmission units being equipped with a plurality of power transmitting coils, the vehicle being equipped with a power receiving coil which works to receive electric power transferred from each of the power transmission units, the malfunction diagnosis method comprising:
   receiving (a) power transmission unit information outputted from each of the power transmission units and (b) vehicle power receiving information outputted from the vehicle; and
   analyzing present position information about the vehicle and present position information-obtained time information about the vehicle which are included in each of pieces of vehicle power receiving information, as received by a information receiver, to identify target power transmission units that are some or all of the power transmission units which have transferred the electric power to the vehicle;
   comparing between transmitted power information included in pieces of the power transmission unit information about the target power transmission units;
   based on the comparing, diagnosing a state of transmission of the electric power from each of the power transmission units, wherein a failure diagnosis for a unit of the power transmission units is determined by the vehicle passing sequentially through the power transmission units, and the vehicle passing through a spot corresponding to the unit of the power transmission units receives improper power transmission of electric power, the improper transmission of electric power determined based on the comparing.

* * * * *